United States Patent [19]

Smith

[11] 4,169,257
[45] Sep. 25, 1979

[54] CONTROLLING THE DIRECTIVITY OF A CIRCULAR ARRAY OF ACOUSTIC SENSORS

[75] Inventor: David A. Smith, Austin, Tex.

[73] Assignee: The United States of America as represented by the Secretary of the Navy, Washington, D.C.

[21] Appl. No.: 900,959

[22] Filed: Apr. 28, 1978

[51] Int. Cl.² ............................................... G01S 3/80
[52] U.S. Cl. ..................................... 367/123; 367/905
[58] Field of Search ...................... 340/6 S, 6 R, 16 R

[56] References Cited

U.S. PATENT DOCUMENTS

| 3,873,958 | 3/1975 | Whitehouse | 340/6 R |
| 3,889,227 | 6/1975 | Takamizawa | 340/6 R |
| 3,935,575 | 1/1976 | Leisterer et al. | 340/6 R X |

Primary Examiner—Richard A. Farley
Attorney, Agent, or Firm—Richard S. Sciascia; Harvey A. David

[57] ABSTRACT

Forming and directive control of the beam in a circular sonar array without time delay or phase shift networks. Predetermined weighting coefficients are used to scale sensor outputs that are summed in an add-only processor to provide a weighted sum output characteristic of target position relative to the main receiving axis of the array.

5 Claims, 12 Drawing Figures

ELEMENTS: 77
SPACING: 0.5λ
CYLINDER RADIUS: 12.3λ
2.4° BEAM SHOWING −19 dB AVERAGE SIDELOBES

CONTROLLING THE DIRECTIVITY OF A CIRCULAR ARRAY OF ACOUSTIC SENSORS

BACKGROUND OF THE INVENTION

This invention relates to sonar systems and more particularly to improvements in sonar beamforming through signal processing.

Beam formation is a well known process by which the directionality of response of an acoustic array of transducers is controlled. The individual transducer elements of an array may be arranged with any spatial distribution, subject only to a constraint on the separation of adjacent elements. A beam pattern is a plot of the response of the array as a function of angle, and shows the direction of maximum response, angular width of the major response lobe (beamwidth), and position and level of minor response lobes. In signal processing terms, beam formation is called "spatial processing," and concerns the method and implementation by which beams are formed.

Conventional beamforming or spatial processing is accomplished through a linear weighted combination of the element's outputs. That is, the beamformer output $E(\theta,t)$ is $$E^*(\theta,t) = \sum_{j=1}^{M} A_j^* e_j^*(\theta,t)$$

where $e_j^*(\theta,t)$ is the complex voltage developed by the jth element when the signal arrives from the angle $\theta$ and at time t, and $A_j^*$ is the complex weighting coefficient which accomplishes beam formation.

Normally, the $A_j^*$ are complex, and the processor is termed a "time delay beamformer." If the $A_j^*$ are truncated to the first revolution ($A_j^* = A_j \exp(i\phi)$ where $i=\sqrt{-1}$ and $-\pi<\phi<\pi$), then the processor is termed a "phase shift beamformer."

Figures 1, 2B:
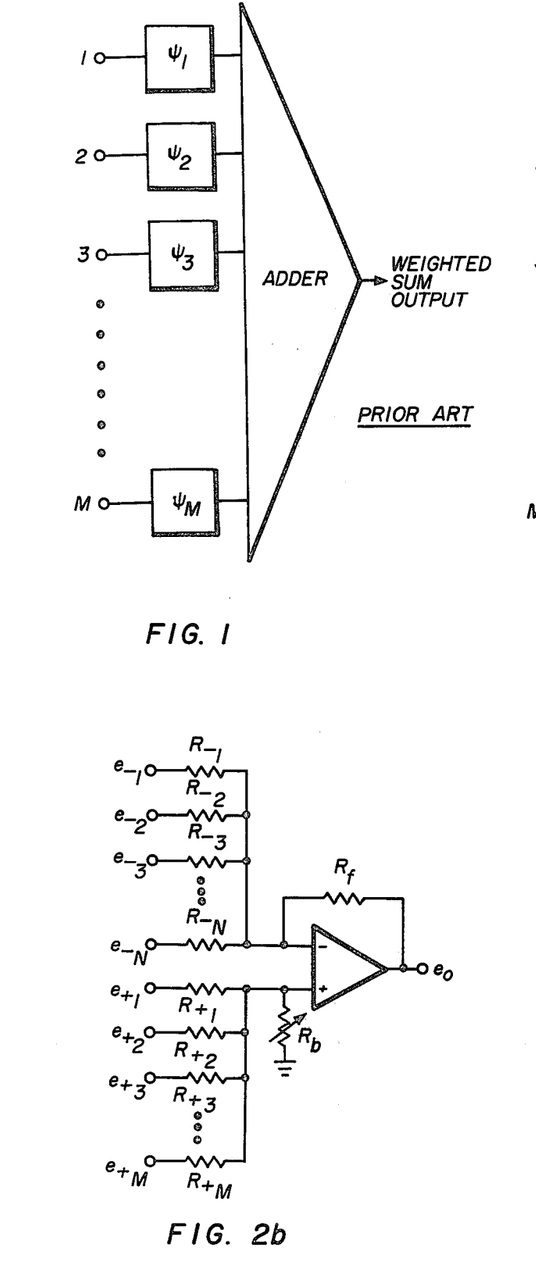
FIG. 1 is a diagrammatic illustration of prior art beamformer processing implementation, the $\psi$'s representing any of a variety of known scaling or weighting means.
FIGS. 2a, 2b, and 2c are diagrammatic illustrations of beamformer processing implementation in accordance with the present invention.

The conventional beam formation process is implemented by use of the components shown in FIG. 1. Sensor or elements 1 through M are allowed to be distributed in space in almost any configuration subject to a spacing constraint. Depending upon the chosen beam formation direction (the major response axis, MRA), the $\Omega$'s are chosen to phase shift or time delay the individual acquired signal so that all signals at the input to the adder appear to be in phase or in time coherence. The scaled or weighted sum of such signals is obviously maximum for targets on the MRA and will decrease when target signals arrive at the array at angles other than the MRA.

For high resolution sonar arrays (small beamwidth), a large number of sensors is required. Small beamwidth requires the array to have a large lateral dimension in terms of the wavelength of sound in water, and the spacing constraint is usually about two elements per wavelength. Furthermore, when a single beam is scanned throughout the required look sector, an unacceptably low data rate is usually attained. A solution is to process the signal with many preformed beams, each covering its fixed portion of the required look sector. To construct such a preformed beam processor requires that the equipment illustrated in FIG. 1 be replicated once for each preformed beam.

The $\psi$'s in FIG. 1 for a time delay beamformer are implemented with electronic delay lines. There are certain drawbacks to this system, however. Delay lines with the required accuracy are rather large and expensive. In addition, because the required accuracy of delay increases for the higher resolution systems, a definite upper limit to resolution exists with delay line beamformers.

If an array of sensors distributed in space were combined as shown in FIG. 1, all the contributing sensors would appear to lie in a plane normal to the MRA. This is the so-called "phasing or time delaying to a plane." Such processing precludes temporal processing on the array, such as replica correlation, signal averaging, or spectrum filtering. Temporal processing is therefore accomplished electronically after the spatial processing.

SUMMARY OF THE INVENTION

With the foregoing in mind, it is a principal object of this invention to provide an improved method and apparatus for effecting sonar beamforming utilizing a circular array of transducer elements.

Another important object is to provide for improved sonar beamforming processing without the use of time delay or phase shift networks.

As another object, the invention aims to accomplish the foregoing through the use of real weighting coefficients whereby only addition need be accomplished by the implementing signal processor.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figures 2A, 2C:
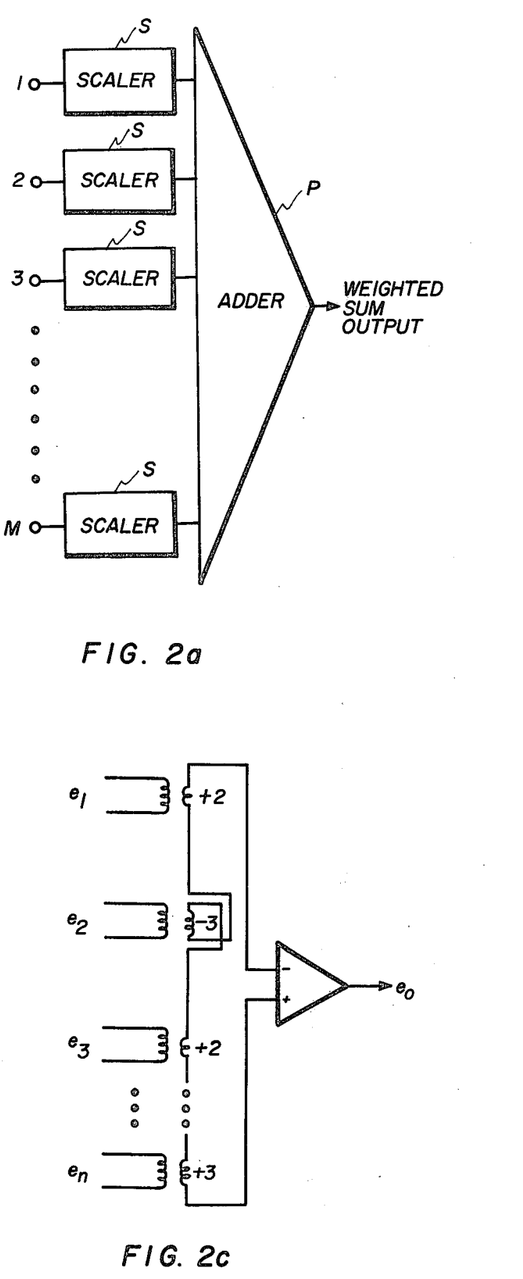

Briefly stated, with reference now to FIG. 2, the invention offers beamforming processing that requires no time delay or phase shift networks. Rather, the outputs of individual array sensors, such as 1-M of FIG. 2a, are subjected to weighting by scalers S that impose weighting coefficients selected in a manner that will become apparent as the specification proceeds. The scalers S may conveniently comprise resistive elements and the adder may comprise a conventional operational amplifier connected as a summer. The weighted or scaled outputs are applied to an adder P that provides a weighted sum output that is maximum when the acoustic signal arrives from a direction corresponding to a selected main receiving axis. Since the sensors are not "phased to a plane," their apparent spatial distribution corresponds directly to their physical spatial distribution. This type of spatial distribution, without compensation by delay lines, allows replica correlation and averaging to occur naturally on the array, as will later become apparent.

Referring to FIG. 2b, the use of resistors in association with an operational amplifier will readily provide the necessary scaling sums and differences. The resistors may be fixed in the case of preformed beams, or may be controllable in the case of steerable beams.

Referring to FIG. 2c, an alternative scaling and summing arrangement comprises scaling transformers in association with a summing amplifier. The numbers and directions of the turns of the individual transformer secondary windings establishes the degree and direction of scaling.

Figure 3:
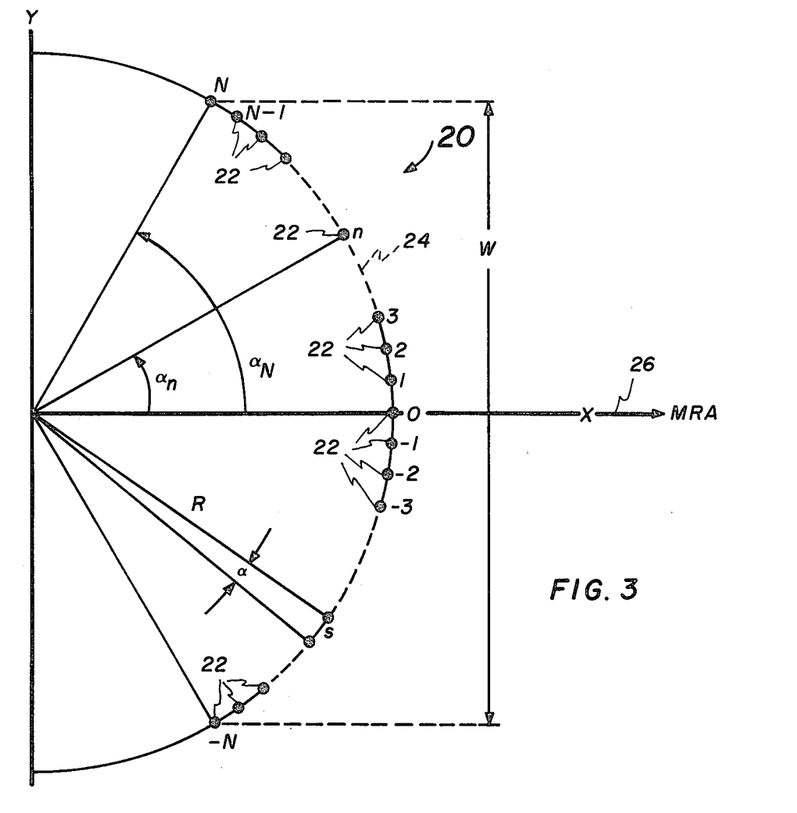
FIG. 3 is a diagrammatic view of a circular sonar array illustrating principles of the present invention.

Consider a circular array 20 of point sensors 22 spread one-half wavelength apart along the arc 24 as shown in FIG. 3. The radius of the circle is R stated in number of wavelengths $\lambda$ of the sound in water. The elements 22 are numbered fron $-N$ to $N$ with the "zeroth" element on the X axis in the direction of the beam formation or along the MRA (Main Receiving Axis) 26.

The problem is to find a set of real weighting coefficients $A(n)$ such that the weighted sum $$E^*(\theta,t) = \sum_{n=-N}^{N} A(n) e_n^*(\theta,t)$$

results in the formation of a beam $|E^*(\theta,t)|$ where the bars indicate the magnitude. $e_n^*(\theta,t)$ is the complex voltage out of the nth element when the target is at an angle $\theta$ from the array. $e_n^*(\theta, t)$ can be written for any specific case given the range to the target, the target angle $\theta$, the frequency and shape or code of the transmitted pulse, and the effects of the individual sensor beam pattern, including the effects of the baffle.

Figure 4:
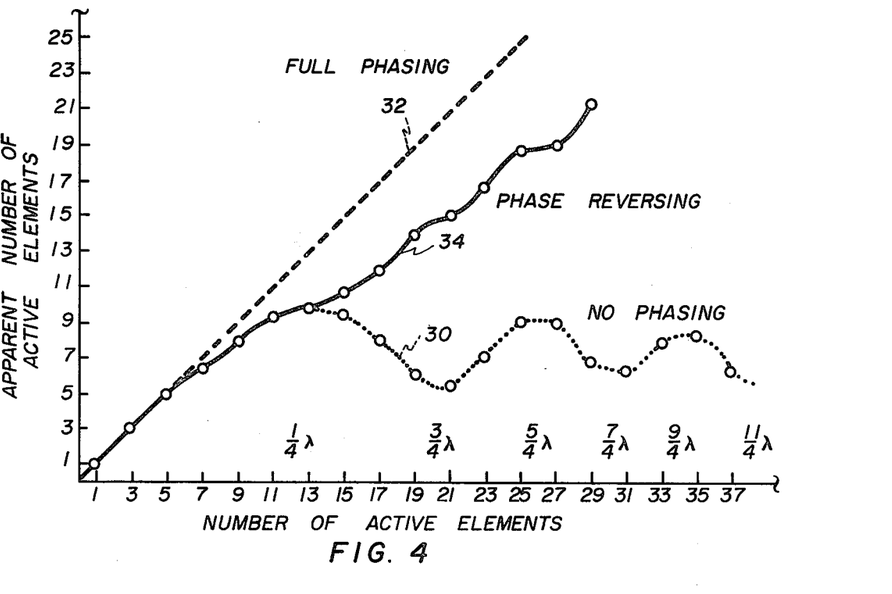
FIG. 4 is a graphic illustration of array sensitivity versus number of elements.

Imagine a cylindrical array whose radius is 15 $\lambda$. Further imagine the array with one element 22 in the target or MRA direction, that is the zeroth element. The array sensitivity will be one unit or one apparent element. If more contiguous elements are added to the array, the array sensitivity will increase until the added elements are far enough around the cylinder to be out of the first Fresnel zone. The dotted curve 30 in FIG. 4 is a plot of the apparent number of elements on the 15 $\lambda$ array versus the actual number of elements.

If phase shift or time delay beamforming were used, each added element 22 would be moved electrically to a point where it would add coherently to the array sensitivity, and the dashed curve 32 would result.

One can see from the dotted curve 30 that the addition of the pair of elements marked 15 will cause the overall sensitivity of the array to decrease because these added elements exist in the second Fresnel zone. If one were to reverse their sign, before adding, the solid curve 34 would result. That is, the solid curve 34 is the result of weighting by $+1$ those elements in the odd numbered zones, and weighting by $-1$ those elements in the even numbered zones. Although this explanation is inexact and oversimplified, it illustrates the basis for choosing the $A_1$ coefficients (the "matched filter" coefficients).

Figure 5:
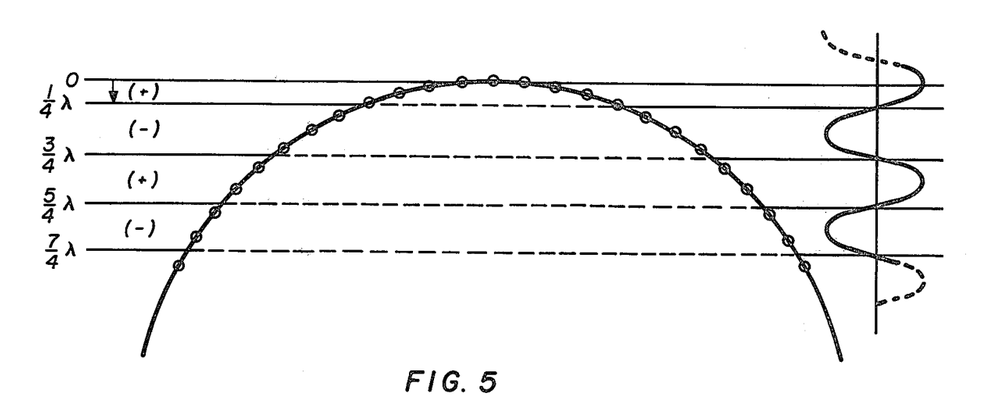
FIG. 5 is a graphic illustration of positions of array elements in a monochromatic plane wave field.

FIG. 5 shows the array with elements 22 in a monochromatic plane wave field. At some instant of time, when a peak positive amplitude occurs at the front element, time is stopped, and a cosine wave exists over the depth of the array. Simply, and more exactly, the $A_1$ shading coefficients are chosen much as one would do with a matched filter. That is, if an element is expected to see an instantaneous voltage of $-0.3$ V, then a weighting factor of $-0.3$ is used for shading. In general the nth element is located at an angle $\alpha_n$ from the MRA direction (see FIG. 3). The distance from the front element in wavelengths is $(R-R \cos \alpha_n)$. Therefore, the instantaneous impressed pressure at the nth element is $$[\cos 2\pi R(1-\cos \alpha_n)]$$

and is selected as a part of the weighting function. That is, this first part is $$A_1(n) = \cos [2\pi R(1-\cos \alpha_n)].$$

It should be noticed here that if array focusing is required, and it most assuredly will be with large arrays, then the plane wave assumption is dropped in favor of a spherical wave resulting from a target at close range, in the nearfield of the array. The algorithm for selecting the $A_1$ shading coefficients is the same, that is, shading by a number related to the instantaneous pressure expected at an element.

A second part of the coefficient selection is a term $A_2(n) = \cos \alpha_n$. This portion of the weighting function corrects for the increased density of elements at the edge of the cylindrical array as seen from a field point on the MRA.

A third part of the total shading coefficient is $A_3(n)$ and is the coefficient which controls the exact beamwidth and first side lobe level. The behavior of the beam pattern character near the MRA (that is, within a few degrees of the MRA) is described approximately by the Fourier transform of the projection of $A_3(n)$ onto a line or plane normal to the MRA. For example, if $A_3(n) = \cos \alpha_n$, then the projection onto a plane normal to the MRA is $$A_3(y) = \sqrt{1-y^2/R^2}.$$

The Fourier transform of $A_3(y)$ is $$D(\theta) = (2J_1(x)/x)$$

where $x = 2\pi R \sin \theta$, and y is the transverse displacement. The half-power beamwidth BW of this function is $$BW = 2 \text{ arc sin } (1.616/2\pi R) \text{ radians},$$

and adequately predicts the half-power beamwidth of modeled arrays of radius $R=12$ through $R=407$ to within 2% of the modeled value.

Finally, the complete shading coefficients are given by the product of their factors, $$A(n) = A_1(n)*A_2(n)*A_3(n)$$

Application of the foregoing has provided two classes of results: the first includes results from a computer implemented mathematical model; the second is one set of experimental data used to validate the mathematical model.

Figure 6:
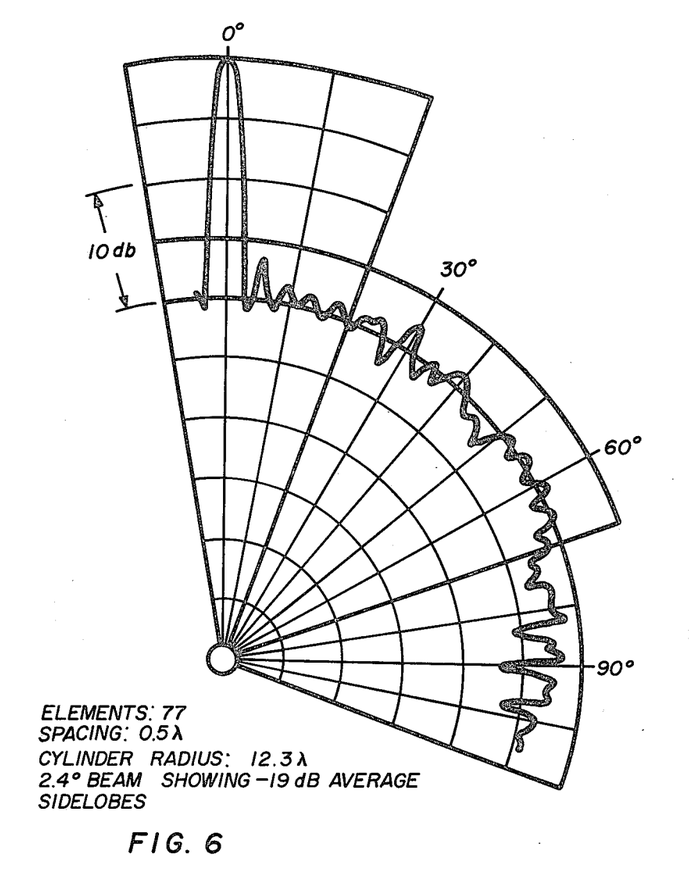
FIGS. 6, 7, and 8 are graphic illustrations of theoretical model results for array cylinders each having a different radius.
Figure 7:
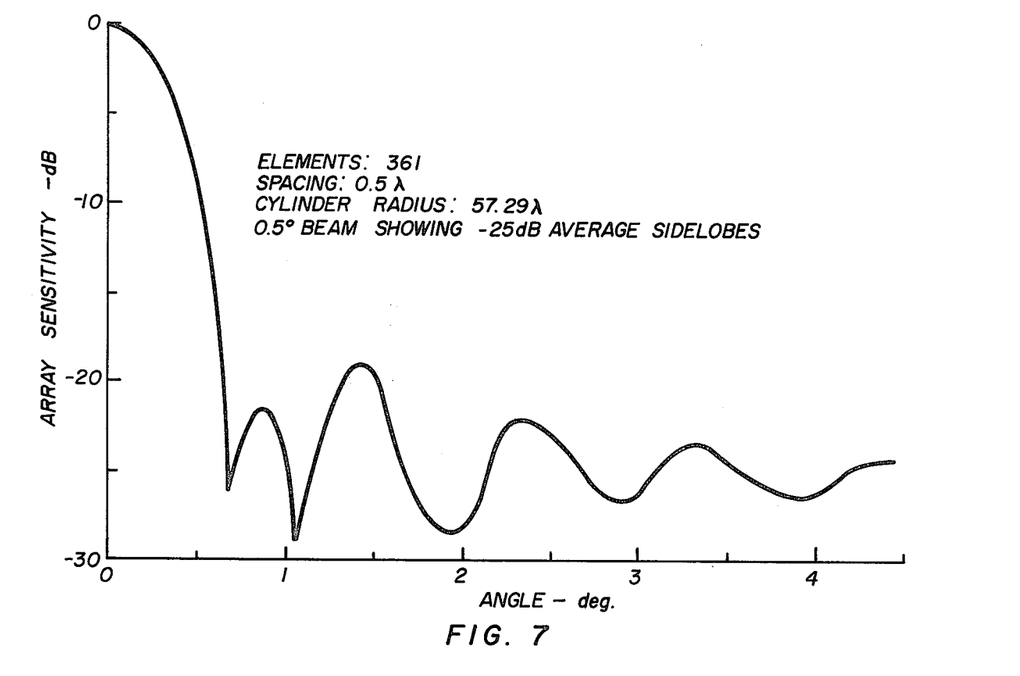
Figure 8:
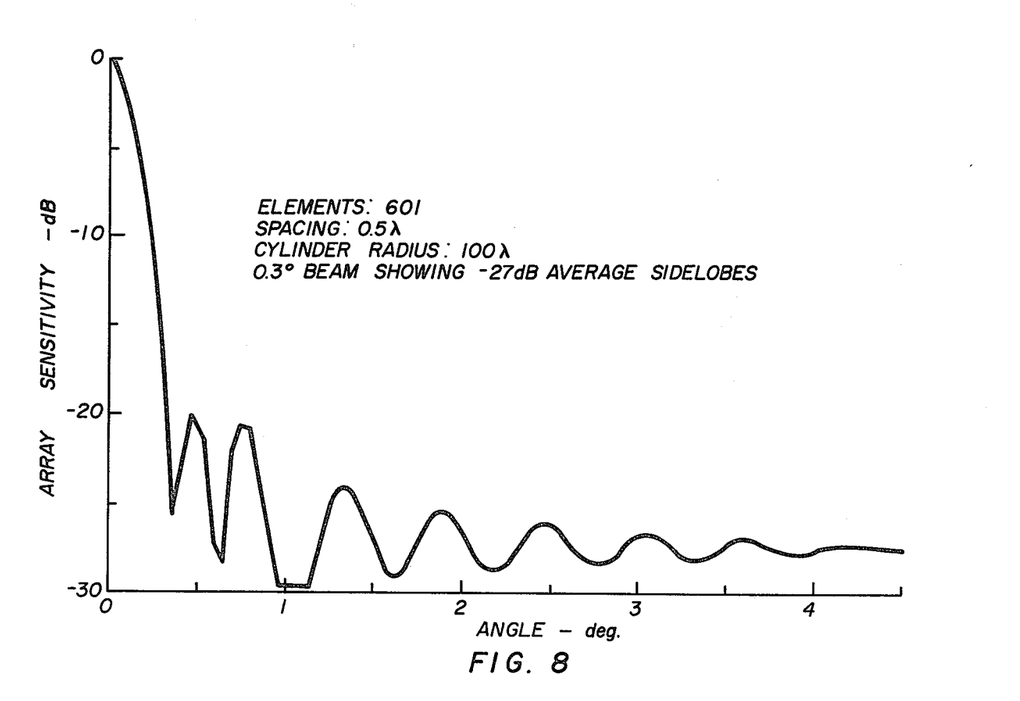

The primary consideration is the azimuthal (in the plane normal to the cylinder axis) beam pattern. FIGS.

6, 7, and 8 show model results for cylinders whose normalized radii are 12.3, 57.3, and 100, respectively. Such plots show the general character of the azimuthal beam patterns. Notable parameters are half-power beamwidth and average side lobe level. For the special case of a target in the farfield and insonified with a long monochromatic signal, and with shading coefficients given by $$A_1(n) = \cos[2\pi R(1 - \cos \alpha_n)]$$

$$A_2(n) = \cos \alpha_n$$

$$A_3(n) = \cos \alpha_n,$$

and acoustic sensors covering one-half of the cylinder, the beamwidth (BW) behaves as $$BW = 2 \text{ arc sin } (1.61633/2\pi R) \text{ radians}$$

or $$BW = 29.5/R \text{ degrees, for } R \geq 10.$$

The average side lobe level has been found to be suppressed below the level of the major lobe by $\overline{SLS}$ (average side lobe suppression) $\approx 10 \log_{10} 2\pi R$.

Because the array of sensors has a nonzero dimension along the direction of the MRA, the adding-only processor exhibits an elevation beam pattern whose half-power beamwidth is approximately described by $$BW_{elevation} = (145/\sqrt{R}) \text{ degrees}.$$

The adding-only processor P forms beams with the aforementioned beamwidth and average side lobe levels at the design center frequency. At operating frequencies within the bandwidth given by $\Delta f = 2f_o/R$, the beam pattern performance is not greatly affected.

The experiment used to validate the computer model was conducted with an array whose size in wavelengths at the design frequency was very small. In spite of the small normalized radius ($R = 3.8$), the measured beam pattern correlates very well with theory and the correlation improves as the normalized radius is increased. Computer model prediction of the results of the use of this type processor is therefore validated.

Figure 9:
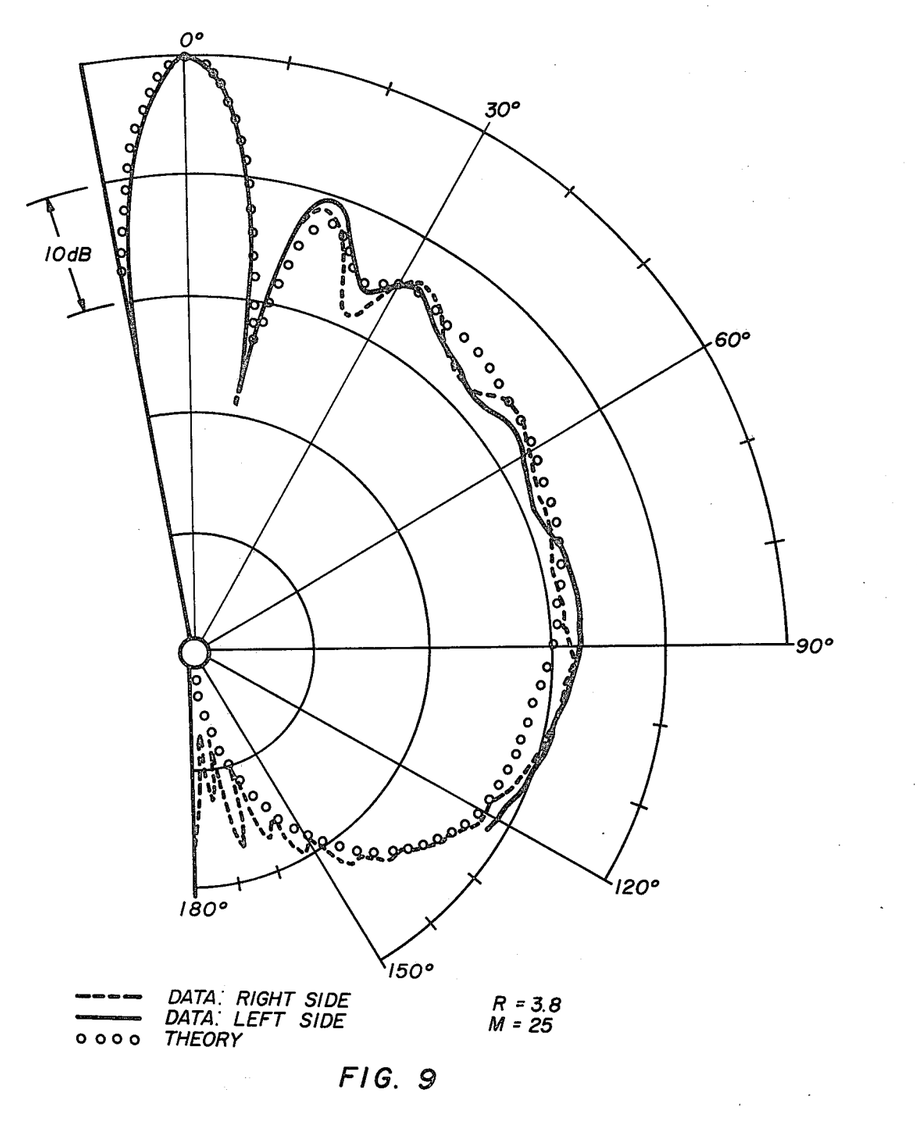
FIGS. 9 and 10 are graphic comparisons of theoretical and experimental results.
Figure 10:
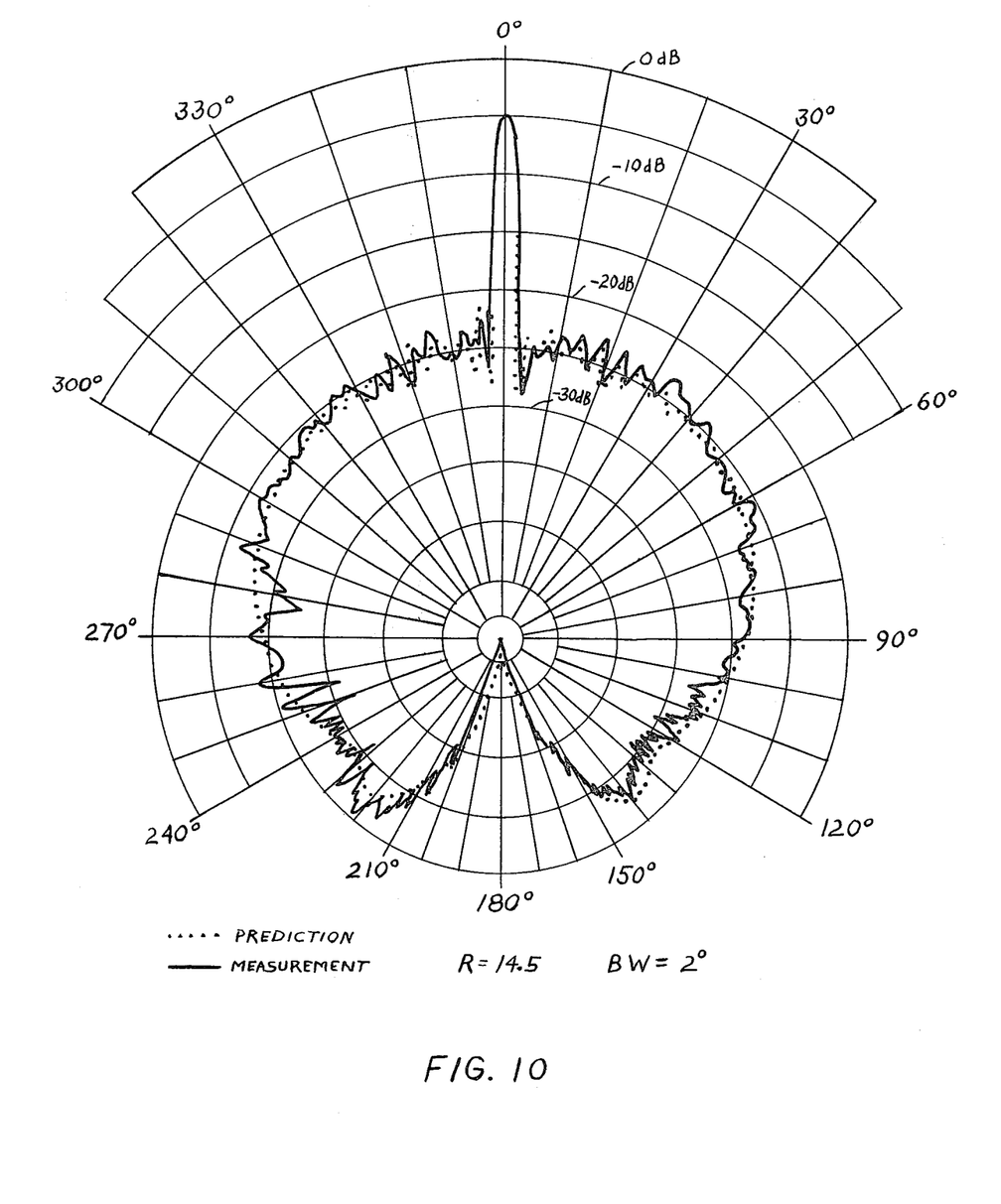

FIG. 9 is an overlay of the predicted and measured azimuthal beam pattern of an array of 25 sensors spread one-half wavelength apart on a cylinder of radius 3.8 wavelengths. The outputs of the individual sensors were scaled by A(n) and summed. The measured and predicted array sensitivity compared to within 0.5 db, and the measured and predicted average side lobe levels were within 0.3 db.

The primary advantage of the method of this invention lies in its simplicity of implementation. High resolution sonar systems require a high data rate, usually attained by constructing many preformed beams. Normal delay line implementation therefore involves the use of many expensive delay lines. The adding-only processor requires only one analog adder or combiner circuit for each preformed beam.

Increasing the angular resolution of an array or spatial processor usually requires components (delay lines) of higher accuracy to achieve comparable performance. For this reason, time delay beamformers are rather limited in the maximum practical achievable resolution. The adding-only processor does not exhibit this effect; in fact, the beam pattern performance increases with higher resolution, and exhibits no increased error sensitivity with increased resolution.

Because the array has dimensions in the direction of the MRA, the processor behaves as a matched filter or replica correlator. Temporal processing can thus be accomplished on the array, rather than in the electronics after beam formation.

Although the example used in this disclosure involves sensors arrayed on the surface of a cylinder, the algorithms for choosing real shading coefficients are the same as that for other space distributions of sensors. For an arbitrary distribution, one can choose $A_1$ coefficients to match filter the chosen expected waveform from the target; one can choose $A_2$ to make the apparent projected sensor density uniform on a plane normal to the MRA; and, finally, one can choose $A_3$ projected on the normal plane to control half-power beamwidth and first side lobe level through the Fourier transform relationship as if $A_3$ were on a plane array.

Although the above example concerns acoustical sensors in water, it will be understood that the invention can also be applied to other radiation, for example, air acoustics and electromagnetic radiation. It will also be understood that, while the terms circular and cylindrical have been used in this specification, those terms are intended to include arcuate arrays wherein the sensors are distributed only around a portion of a circle or cylinder.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A method for controlling the directivity of a circular array of acoustic sensors so as to be characterized by a formed beam along a main receiving axis, said method comprising the steps of:

providing a circular array of radius R including sensors 1 through N disposed on one side of a zeroth sensor on said main receiving axis and $-1$ through $-N$ disposed on the other side of said zeroth sensor, said sensors being equally spaced aximuthally from one another;

imposing a set of weighting coefficients A(n) on the outputs of said sensors, said coefficients A(n) each comprising a product of a signal replica factor $A_1(n) = \cos[2\pi R(1 - \cos \alpha_n)]$, a sensor density correction factor $A_2(n) = \cos \alpha_n$, and an aperture illumination factor $A_3(n) = \cos \alpha_n$, where $\alpha_n$ is the angle of the nth sensor from said main receiving axis, so as to provide weighted sensor outputs; and adding said weighted sensor outputs such that the weighted sum output $$E^*(\theta,t) = \sum_{n=-N}^{N} A(n) \, e_n^*(\theta,t);$$

results in formation of a beam $|E^*(\theta,t)|$, where the bars indicate the magnitude of the sum and $e_n^*(\theta,t)$ is the complex voltage output of the nth sensor when a target is at an angle $\theta$ from the main receiving axis.

2. A method as defined in claim 1, and wherein said radius R is a predetermined number of wavelengths λ of incident acoustic energy.

3. A sonar system characterized by a formed beam along a main receiving axis, said system comprising:
   a circular transducer array including a predetermined number of electroacoustic transducer elements, said elements being equally spaced from one another along an arc having a predetermined radius R and extending N elements to both sides of said main receiving axis;
   a plurality of signal scaler means, each responsive to the output of an individual one of said elements, for providing a corresponding plurality of weighted output signals scaled in accordance with predetermined weighting coefficients A(n), each of which is the product of a signal replica factor $A_1(n)$, a density correction factor $A_2(n)$, and an aperture illumination factor $A_3(n)$, where $A_1(n) = \cos[2\pi R(1 - \cos \alpha_n)]$, $A_2(n) = \cos \alpha_n$, $A_3(n) = \cos \alpha_n$, and $\alpha_n$ is the angle of the nth sensor from said main receiving axis; and
   summing means, responsive to said weighted output signals for providing a weighted sum output signal $$E^*(\theta, t) = \sum_{n=-N}^{N} A(n) e^*_n(\theta, t)$$

where
   $\theta$ is the angle of incidence of acoustic energy relative to said main receiving axis and $e_n^*(\theta, t)$ is the complex voltage output of the nth sensor when a target is at said angle $\theta$.

4. A system as defined in claim 3, and wherein:
   said scaler means comprise a plurality of resistive elements each connected in series with one of said transducer elements; and
   said summer means comprises an operational amplifier including positive and negative input connections each connected to predetermined ones of said resistive elements in accordance with positive and negative signal replica factors so as to provide said weighted sum output signal.

5. A system as defined in claim 3, and wherein:
   said scaler means comprises transformer means including a plurality of primary windings each responsive to the output signal of an individual one of said transducer elements, said transformer means further comprising a plurality of secondary windings connected in series and each characterized by direction and number of turns corresponding to the weighted coefficient for an associated transducer element; and
   amplifier means connected to said series connected secondary windings to provide said weighted sum output signal.

* * * * *